Figure 8:
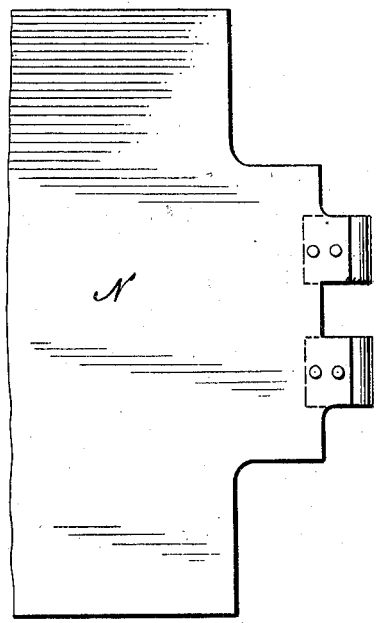

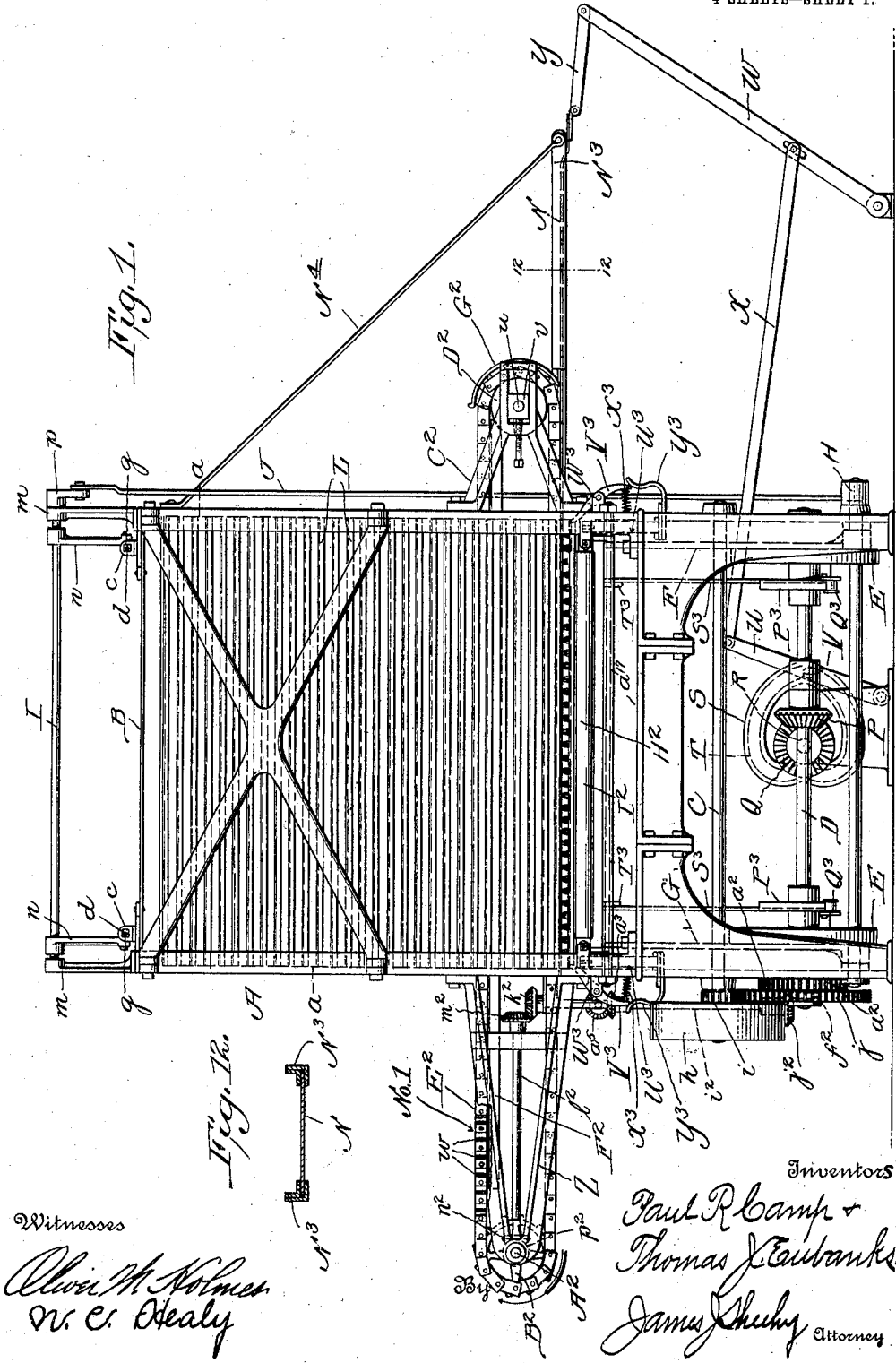

P. R. CAMP & T. J. EUBANKS.
APPARATUS FOR COOLING CANDY STICKS.
APPLICATION FILED NOV. 1, 1909.
963,513.
Patented July 5, 1910.
4 SHEETS—SHEET 2.
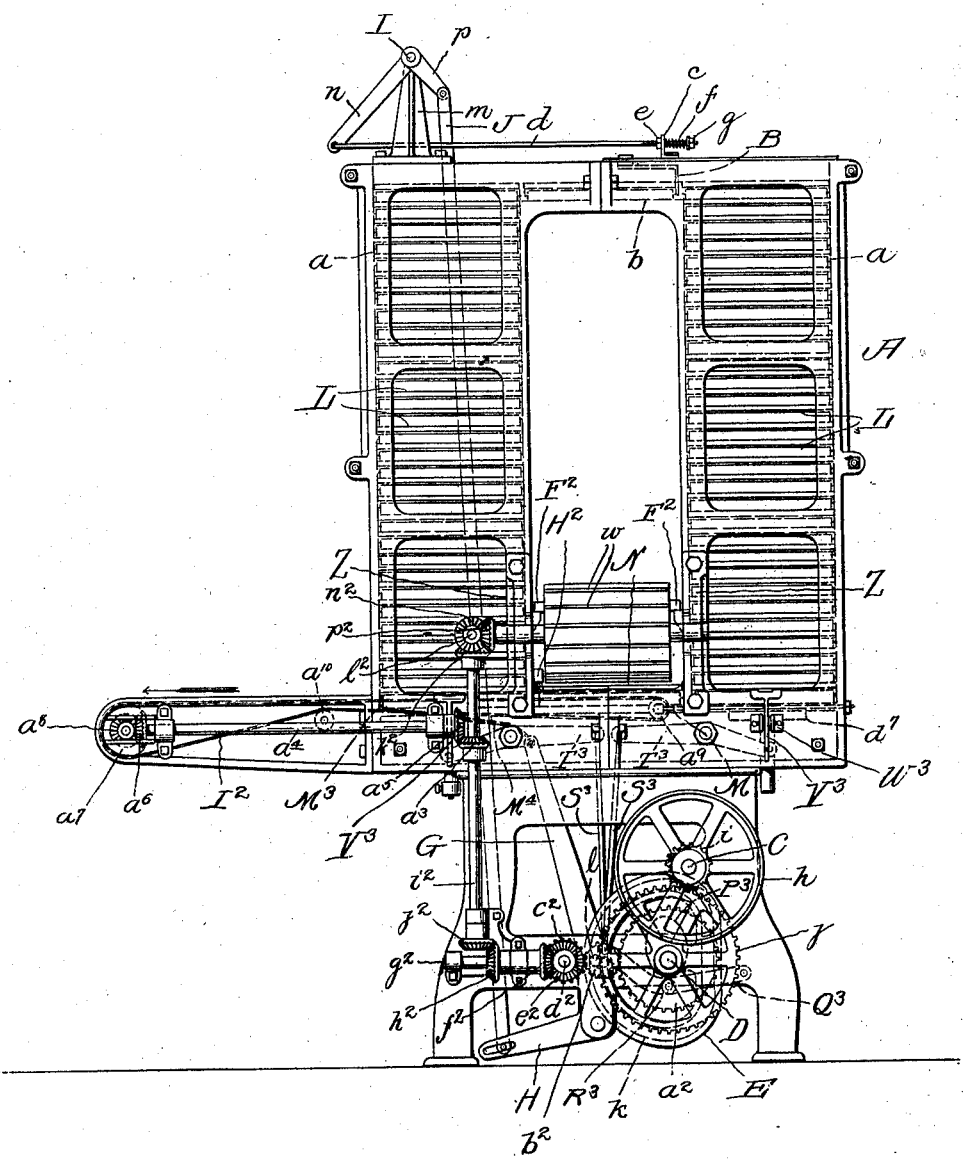

P. R. CAMP & T. J. EUBANKS.
APPARATUS FOR COOLING CANDY STICKS.
APPLICATION FILED NOV. 1, 1909.
963,513.
Patented July 5, 1910.
4 SHEETS—SHEET 3.
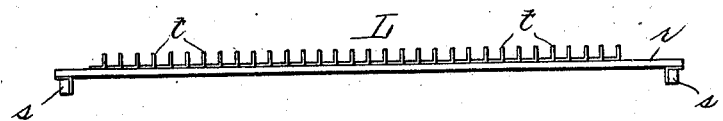
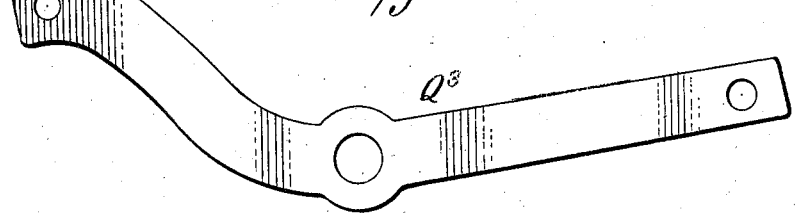
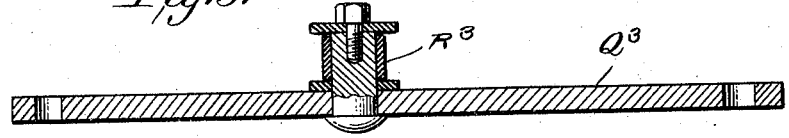
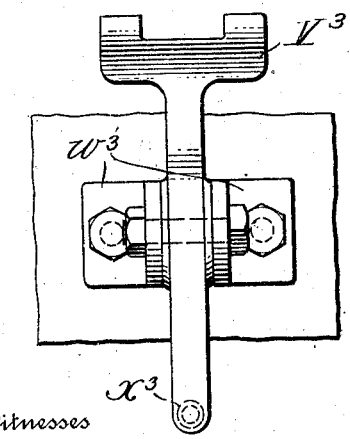
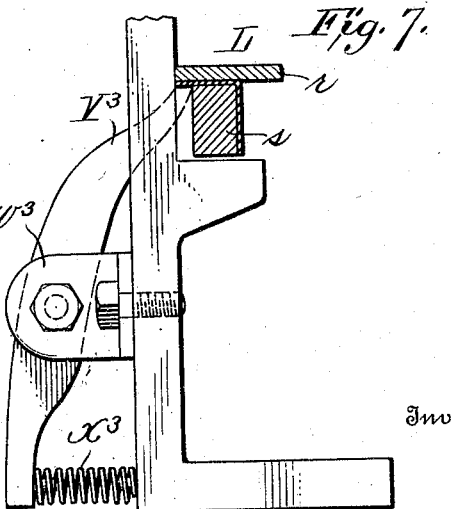
Witnesses
Inventors
Paul R. Camp +
Thomas J. Eubanks
By James J. Sheehy
Attorney

UNITED STATES PATENT OFFICE.

PAUL R. CAMP AND THOMAS J. EUBANKS, OF MARIETTA, GEORGIA, ASSIGNORS TO HUDSON STICK CANDY MACHINE CO., OF ATLANTA, GEORGIA.

APPARATUS FOR COOLING CANDY-STICKS.

963,513.  Specification of Letters Patent.  Patented July 5, 1910.

Application filed November 1, 1909. Serial No. 525,756.

*To all whom it may concern:*

Be it known that we, PAUL R. CAMP and THOMAS J. EUBANKS, citizens of the United States, residing at Marietta, in the county of Cobb and State of Georgia, have invented new and useful Improvements in Apparatus for Cooling Candy-Sticks, of which the following is a specification.

This invention relates to the manufacture of candy, and more particularly to the production of candy sticks; and it contemplates the provision of a compact and efficient apparatus for cooling candy sticks so as to render the same fit for boxing.

The invention also contemplates the provision of an apparatus for the purpose stated constructed with a view of rendering it unnecessary for an attendant to pay any attention to the apparatus except to take the cooled candy sticks therefrom at intervals as will be hereinafter set forth.

With the foregoing in view the invention will be fully understood from the following description and claims when the same are read in connection with the drawings, accompanying and forming part of this specification, in which:

Figure 1 is a side elevation of an apparatus constructed in accordance with our invention and constituting the best practical embodiment of the invention that we have as yet devised. Fig. 2 is an end elevation of the apparatus. Fig. 3 is a side elevation of one of the trays comprised in the apparatus. Fig. 4 is a side elevation, and Fig. 5 a horizontal section of one of the cam-actuated levers of the apparatus. Figs. 6, 7, 8, 9, 10 and 11, are views of working parts of the apparatus hereinafter referred to in detail. Fig. 12 is a detail transverse section taken in the plane indicated by the line 12—12 of Fig. 1 and showing the arrangement of the support N in the guides $N^3$ that are connected to the main frame and braced by the bars $N^4$.

Similar letters designate corresponding parts in all of the views of the drawings, referring to which:

A is the main frame of the apparatus, which is of the general configuration shown in Figs. 1 and 2. The said main frame is provided at its opposite ends and at opposite sides of its longitudinal center with upright guideways $a$ for the end portions of trays hereinafter described. The guideways $a$ are open at their upper and lower ends, and the upper ends of the guideways at one side of the apparatus are connected with the upper ends of the guideways at the opposite side by a horizontal support $b$, Fig. 2; the invention contemplating raising the superposed trays step by step at one side of the apparatus, moving the trays across on the support $b$, and lowering the superposed trays at the opposite side of the apparatus.

For the purpose of moving the trays horizontally at the top of the apparatus, as stated, we provide the follower B having upwardly extending apertured lugs $c$, Figs. 1 and 2. The said lugs $c$ receive rods $d$ through the medium of which the follower is moved in opposite directions, and each rod $d$ is provided at one side of the adjacent lug with a nut $e$, and at the opposite side of the lug with a coiled spring $f$ interposed between the lug and a second nut $g$ on the rod. Thus it will be manifest that when the rods $d$ are pulled toward the left in Fig. 2 the action of said rods on the follower will be cushioned and the follower will be drawn in the same direction. It will also be manifest that when the rods $d$ are moved toward the right in Fig. 2, the nuts $e$ acting against the lugs $c$ will move the follower B toward the right. The movement of the follower B is from the position shown by dotted lines in Fig. 2 to a position at the right hand side of the right hand series of superposed trays and return, and from this it follows that the follower is adapted to move the tray into the position shown by dotted lines in Fig. 2 above the support $b$, and then upon its succeeding movement toward the left, is adapted through the medium of the tray before it, to move the first mentioned tray from the position above the support $b$ to a position at the top of the series in the left-hand guideways $a$ of the apparatus.

Figure 9:
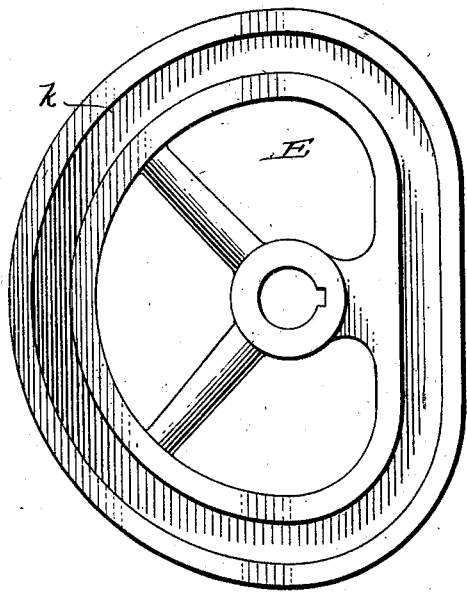

C is the drive-shaft of the apparatus. The said drive-shaft is equipped with a band pulley $h$, and from the shaft the follower B is moved to and fro through the medium of the following driving connection, viz: a spur gear $i$ on shaft C, a spur gear $j$ intermeshed with the said gear $i$ and fixed on a shaft D, disks E (one of which is shown in Fig. 9) fixed on the shaft D and having cam grooves $k$ in their outer sides, suitably supported levers F and G having lateral projections $l$ disposed in the grooves $k$ of disks E, an arm H fixed to the adjacent lever G, a rockshaft I journaled in suitable standards $m$ at the top of the main frame A and having cranks $n$ connected to the rods $d$, and also having an end crank $p$, and a rod J extending between and connected to the arm H and $p$. By virtue of the construction described, oscillation of the lever G by the cam disk E adjacent thereto, will be attended by oscillation of the arm H, and consequently the follower B will be moved in the manner before described at the proper times. It will also be noted at this point that because of the configuration of the cam grooves $k$ in the disks E, the levers F and G and the arm H will have periods of idleness, as will also the follower B; the periods of idleness of the said follower B occurring while the follower is at the right-hand side of the right hand vertical series of trays.

L L are the trays of the apparatus of which sixty two are employed. The said trays are identical in construction and therefore a detailed description of the one shown in Fig. 3 will suffice to impart a definite understanding of all. The said tray L, Fig. 3, comprises a rectangular metallic plate $r$ of greater length than width, transverse strips of wood fixed to the under side of the plate and arranged about the distance illustrated from the ends thereof, and a plurality of upstanding transverse partitions $t$ fixed on the upper side of the plate and designed to receive between them and to hold apart the candy sticks or sections to be cooled. We prefer to employ the said partitions $t$ for the purpose stated, but we do not desire to be understood as limiting ourselves to the use thereof, inasmuch as said partitions may be omitted without materially affecting the candy-carrying capacity of the trays or the efficiency of the apparatus as a whole.

M M, Figs. 1 and 2, are horizontal rails or supports arranged a slight distance below the lower ends of the vertical guideways $a$ and adjacent the opposite ends of the apparatus and extending throughout the width thereof. On the said supports M the strips $s$ of the trays L rest while the said trays are being moved horizontally from a position below the left-hand vertical series of trays in Fig. 2, to a position below the right-hand vertical series of trays.

N is a longitudinally movable, horizontal support which is preferably in the form of a metallic plate, as shown in Figs. 1, 2, 8, and 12. The said support N is arranged in a horizontal plane slightly above the plane of the supports M, and is reciprocated by the drive-shaft C through the spur gear $i$, the spur gear $j$, the shaft D, a miter gear P on the shaft D, a miter gear Q, fixed on a suitably supported shaft R disposed at right angles to the shaft D, and intermeshed with the miter gear P, a cam S fixed on the shaft R and having a heart-shaped groove T, a lever U having a lateral projection V disposed in the said cam groove, a lever W mounted at about the distance shown from the main frame A, a link X connecting the levers U and W, and a link Y connecting the lever W and the outer end of the support N, all as clearly shown in Fig. 1.

Z Z are brackets extending from one end of the main frame A. $A^2$ is a shaft journaled in said brackets and bearing sprocket wheels $B^2$.

$C^2$, Fig. 1, is one of a pair of brackets extending from the opposite end of the main frame.

$D^2$ is a roller having trunnions $u$ journaled in movable bearings $v$ mounted in the brackets $C^2$, and $E^2$ is an endless conveyer mounted on the sprocket wheels $B^2$ and the roller $D^2$, and having spaced cross-bars $w$; the spaces between the said cross-bars $w$ being designed to receive candy sticks or sections that are to be cooled. The said conveyer $E^2$ is driven from the drive-shaft C through the medium of the spur gear $i$ on the said shaft C, the spur gear $j$ on the shaft D, a second spur gear $a^2$ on shaft D, a suitably supported spur gear $b^2$ intermeshed with the spur gear $a^2$, a spur gear $c^2$ fixed on a shaft $d^2$ and intermeshed with the spur gear $b^2$, a miter gear $e^2$ also fixed on the shaft $d^2$, a miter gear $f^2$, fixed on a shaft $g^2$ disposed at right angles to the shaft $d$ and intermeshed with the miter gear $e^2$, a miter gear $h^2$ fixed on the shaft $g^2$, a vertical shaft $i^2$, a miter gear $j^2$ on the lower end of said shaft intermeshed with the miter gear $h^2$, a miter gear $k^2$ on the upper end of the shaft $i^2$, a horizontal shaft $l^2$, a miter gear $m^2$ fixed on said shaft and intermeshed with the miter gear $k^2$, a miter gear $n^2$ on the other end of the shaft $l^2$, and a miter gear $p^2$ fixed on the shaft $A^2$ and intermeshed with the said miter gear $n^2$.

We would here have it understood that the candy sticks to be cooled are supplied one by one to the upper stretch of the conveyer $E^2$ at about the point No. 1, and that disposed below the upper stretch of the conveyer is a fixed support $F^2$ which has for its office to prevent the candy sticks from dropping from the upper stretch of the conveyer. Said support $F^2$ also serves, during the movement of the conveyer in the direction indicated by arrow, to straighten any candy sticks that may be bent at the time the same are placed in the spaces between the cross-bars $w$ of the conveyer. The support $F^2$ extends to a point adjacent the roller $D^2$, and a guard or shield $G^2$, curved as shown, is employed to prevent the candy sticks from dropping from the spaces in the conveyer $E^2$ while the said spaces are passing around the roller $D^2$.

The before described support N is moved longitudinally inward at a rate of speed corresponding to that of the conveyer $E^2$ so as to enable the said support N to support the candy sticks as soon as the latter pass beyond the lower edge of the guard $G^2$, and when the said support N reaches the end of its inward traverse it is withdrawn or moved back to the position shown in Fig. 1.

Our invention contemplates the disposition of one of the trays L on the supports M and below the lower stretch of the conveyer $E^2$ at the time that the support N is moved outward as described, and from this it follows that the candy sticks released from the conveyer by the outward movement of the support N will drop one by one into the spaces between the partitions $t$ of the mentioned tray.

From the position below the conveyer $E^2$ the tray mentioned is moved to a position below the guideways $a$ at the right of Fig. 2, and is then moved step by step up the said guideways $a$, then across on the upper horizontal support $b$ to the upper ends of the guideways $a$ at the left of Fig. 2, then step by step down through the latter guideways $a$, and then back to the position below the lower stretch of the conveyer $E^2$, and this course of movement is common to all of the trays employed.

It will also be understood from the following detailed description that the described movements of each tray are effected in part by the tray or trays behind it. The described movements of trays carrying candy sticks from a point below the lower stretch of the conveyer $E^2$, up the right-hand side of the apparatus and then across and down the other side of the aparatus result in the candy sticks being quite cool when the trays carrying the same reach the lower ends of the guideways $a$ at the left of Fig. 2. We therefore provide a longitudinally disposed fixed brush $H^2$ for sweeping the candy sticks from each tray incidental to the movement of the said tray from a point below the lower ends of the guideways at the left of Fig. 2, to a point below the conveyer $E^2$; the relative arrangement of the said brush $H^2$ being clearly shown in Figs. 1 and 2.

The candy sticks removed as stated from a tray while the same is being moved to the position below the conveyer $E^2$, are received on the upper stretch of a belt $I^2$, preferably of canvas, which belt $I^2$ is driven in the direction indicated by arrow in Fig. 2 by the before-described shaft $i^2$ through the medium of a miter gear $a^3$ thereon, a shaft $a^4$ having a miter gear $a^5$ intermeshed with the miter gear $a^3$, and also having another miter gear $a^6$, and a roller $a^7$ having a miter gear $a^8$ intermeshed with the miter gear $a^6$. The roller $a^8$ supports the outer portion of the belt $I^2$, and said belt is also supported by a roller $a^9$, and an idler roller $a^{10}$, the latter being designed to prevent the lower stretch of the belt from interfering with the movement of certain parts hereinafter described.

The cooled candy sticks deposited on the belt $I^2$ are carried by the said belt to a point at the left-hand side of the main frame in Fig. 2, and are removed from the belt at such point by hand or otherwise, and are then fit to be packed in boxes.

As will be observed by reference to Fig. 2, the upper stretch of the belt $I^2$ is disposed in a horizontal plane above the fixed horizontal supports M, and from this it follows that while, during the movement of each tray from a position below the left-hand vertical series of trays to a position below the conveyer $E^2$, the plate $r$ of the tray will rest above the upper stretch of the belt, the strips $s$ of the tray will rest and move on the supports M.

Disposed under the upper stretch of the belt $I^2$ and movable on the supports M in position to engage the outer ends of the strips $s$ of a tray resting on the said supports, is a follower $M^3$ which is connected through bars $M^4$ with the upper ends of the before described levers G. Thus it will be seen that when the said levers G are moved toward the right in Fig. 2, the follower $M^3$ will move before it and to a position below the conveyer, a tray lowered from the guideways $a$ at the left of Fig. 2; also, that upon the movement of the levers G in the opposite direction, the follower $M^3$ will be returned to the position shown in Fig. 2. It will further be noted in this connection that the described movements of the follower $M^3$ will be coincident with the movements of the follower B at the top of the apparatus, and that the movements of both followers will take place while the two vertical series of trays are at rest.

$P^3$ $P^3$ are cams fixed on the shaft D.

$Q^3$ $Q^3$ are suitably supported levers fulcrumed at their outer ends and having anti-friction rollers $R^3$ $R^3$ at points intermediate their ends for the engagement of said cams.

$S^3$ $S^3$ are rods connected to and reaching upward from the inner ends of the levers $Q^3$, and $T^3$ $T^3$ are levers fulcrumed at intermediate points of their length and connected at their inner ends with the rods $S^3$. There are two or a pair of the levers $T^3$ adjacent each end of the apparatus, and the outer ends of the said levers are arranged under tray elevators $U^3$, Figs. 1, 2, 10 and 11, there being two of the said elevators employed, and one being disposed at one side of the longitudinal center of the apparatus, and the other at the opposite side of said center.

Figure 10:
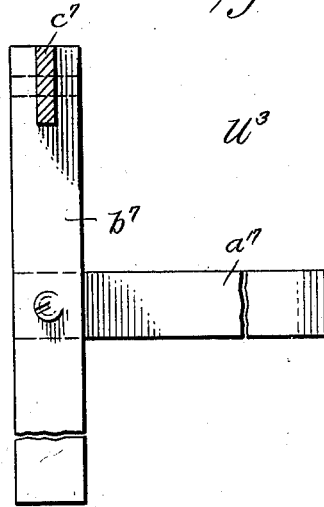
Figure 11:
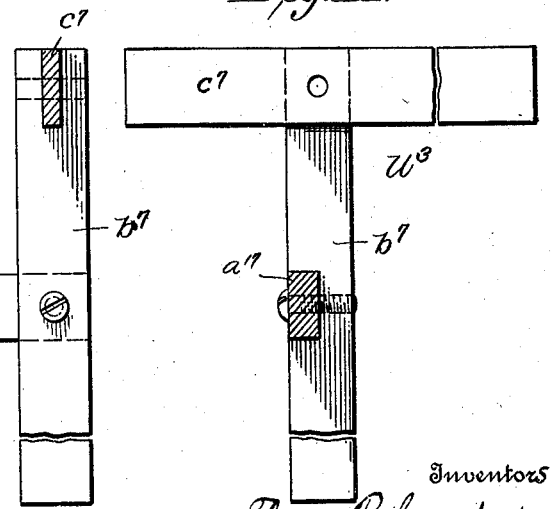

As will be readily observed by comparison of Figs. 10 and 11, each elevator $U^3$ comprises a longitudinal bar $a^{17}$ (shown as broken in Fig. 10), stems $b^7$ fixed to and extending above and below the ends of the longitudinal bar, and T-heads $c^7$ fixed on the upper ends of the said stems. The stems $b^7$ of the elevators are suitably guided and movable vertically in the main frame A, and the bars $a^{17}$ are arranged above and in engagement with the outer arms of the levers $T^3$. The T-heads $c^7$ of the elevators are arranged in the same vertical planes as the strips $s$ of the trays L, and when the elevators are in their lowermost positions the said T-heads $c^7$ rest in recesses $d^7$, Fig. 2, in the supports M and below the upper sides of the said supports. By virtue of the described construction and relative arrangement of the tray elevators $U^3$, it will be manifest that when the inner arms of the levers $T^3$ are drawn downward, the elevators $U^3$ will raise the superposed trays in the two series above the elevators, while when the inner arms of the levers $T^3$ are raised the elevators $U^3$ will follow the outer arms of the levers in the downward movement thereof.

$V^3$ $V^3$ are tray-supporting latches of which four are employed, two at each end of the apparatus. One of the said latches is shown on an enlarged scale in Figs. 6 and 7, and by reference to said figures it will be noted that the latch is in the form of a lever that is fulcrumed at an intermediate point of its length on a support $W^3$, and has an upper arm adapted to assume a position below the extended end portion of each tray, and a lower arm between which and the main frame a coiled spring $X^3$ is supported and interposed, the office of the said spring being to return the latch to and yieldingly hold the same in the position shown in Fig. 7.

Fixed to and extending outward from the tray elevator $U^3$ at the left-hand side of the apparatus are two tappets $Y^3$, designed on upward movement of the elevator to engage and press the lower arms of the latches $V^3$ adjacent said tappets inward against the action of the springs $X^3$ complementary to the said latches.

The operation having to do with the transfer of the trays to and from the vertical guideways $a$ is as follows: A tray being in place under the guideways $a$ at the right of Fig. 2, the elevator $U^3$ at that side of the apparatus will on its upward movement raise the said tray and move the same past the upper arms of the adjacent latches $V^3$, whereupon the said tray will raise the superposed trays above it and will itself assume a position above the upper arms of the latches, whereupon it and the other trays in the vertical series will be supported by the latches. At the same time the elevator $U^3$ at the left-hand side of the apparatus in Fig. 2 engages and slightly raises the lowermost tray in the left-hand vertical series as well as the trays above said lowermost tray, and then the tappets $Y^3$ on the left-hand elevator engages the left-hand latches $V^3$ and releases the said lowermost tray and allows the same to descend to the supports M, the upper arms of the said latches $V^3$ in the meantime resuming their normal positions so as to engage and support the next upper tray of the series and the superposed trays above said tray. The tray lowered by the left-hand elevator $U^3$ is then moved by the follower $M^3$ toward the right in Fig. 2 and to a position below the endless conveyer $E^2$, and while the said tray is *en route* to said position the brush $H^2$ sweeps the cooled candy sticks from the tray and causes said sticks to assume positions on the upper stretch of the endless belt $I^2$ by which the sticks are carried to a point at the left-hand side of the apparatus in Fig. 2 from whence they may be removed by hand or in any other manner consonant with the purpose of our invention. The tray moved as stated under the conveyer $E^2$ is supplied with candy sticks from the conveyer in the manner before described, and then upon the succeeding movement of the follower $M^3$ toward the right in Fig. 2, the said follower through the medium of the full tray placed before it, serves to move the first-named tray from the position below the conveyer $E^2$ to a position below the right-hand guideways $a$, and this operation is continued during the working of the apparatus; the trays being carried in a closed cycle up one side and across the top and down the other side and across the bottom of the apparatus, and being charged with and discharged of the candy sticks in the manner described in detail.

It will be gathered from the foregoing that our novel apparatus is possessed of large capacity, and this notwithstanding the compactness of the apparatus, and the fact that it takes up but a small amount of floor space.

While we have shown and described one form of our invention, it is to be understood that we are not limited to the details or the form or relative arrangement of parts disclosed, but that extensive modifications may be made therein without departing from the spirit thereof.

Having described our invention, what we claim and desire to secure by Letters-Patent, is:

1. In an apparatus for cooling candy sticks, the combination of a plurality of trays movable one before the other and each by the tray that follows it in a cycle and adapted to carry candy sticks to be cooled, means for so moving the trays, and means for guiding the trays incidental to said movement.

2. In an apparatus for cooling candy sticks, the combination of a plurality of trays movable one before the other and each by the tray that follows it in a cycle and adapted to carry candy sticks to be cooled, means for so moving the trays, means for guiding the trays incidental to said movement, means for supplying the trays one by one with sticks to be cooled, and means for relieving the trays one by one of cooled sticks.

3. In an apparatus for cooling candy sticks, the combination of a plurality of trays movable one before the other and each by the tray that follows it in a cycle and adapted to carry candy sticks to be cooled, means for so moving the tray, means for guiding the trays incidental to said movement, means for supplying the trays one by one with sticks to be cooled, means for removing cooled sticks from the trays one by one, and means for receiving the cooled sticks so removed and carrying the same to a point from whence the cooled sticks may be taken from the apparatus.

4. In an apparatus for cooling candy sticks, the combination of an endless conveyer for carrying sticks to be cooled, a stationary support over which the sticks are rolled by the upper stretch of the conveyer, a movable bottom adapted in one position to support candy sticks in the lower stretch of the conveyer, a plurality of trays movable one before the other upward at one side of the conveyer, across above the conveyer, downward at the opposite side of the conveyer and across below the movable bottom, means for moving the conveyer, means for moving the said bottom, means for moving the trays, means for removing candy sticks from the trays one by one precedent to the movement of each tray into position below the conveyer, and means for receiving the cooled sticks so removed and carrying the same to a point from whence the cooled sticks may be taken from the apparatus.

5. In an apparatus for cooling candy sticks, the combination of means for supplying quotas of sticks to be cooled, a plurality of trays movable step by step upward at one side of said means, across above said means, downward at the opposite side of said means and across below the means, means for so moving the trays, and means for removing candy sticks from each tray precedent to the movement of the same into position below the supplying means.

6. In an apparatus for cooling candy sticks, the combination of an endless conveyer having spaced partitions adapted to receive between them sticks to be cooled, a stationary support over which the sticks are rolled by the upper stretch of the conveyer, a movable bottom adapted in one position to support candy sticks in the lower stretch of the conveyer, means for moving the conveyer, means for moving said bottom, trays movable one by one into position below the movable bottom, and means for so moving the trays.

7. In an apparatus for cooling candy sticks, the combination of an endless conveyer having spaced partitions adapted to receive between them sticks to be cooled, a stationary support over which the sticks are rolled by the upper stretch of the conveyer, a movable bottom adapted in one position to support candy sticks in the lower stretch of the conveyer, means for moving the conveyer, means for moving said bottom, trays movable one after the other in a cycle to and from a position below the movable bottom, and means for removing sticks from each tray precedent to the positioning of the same below the movable bottom.

8. In an apparatus for cooling candy sticks, the combination of a main frame having vertical guideways separated by an intervening space, supporting means connecting the upper ends of the said guideways, supporting means extending between and below the lower ends of the guideways, a follower movable above the upper supporting means, a follower movable above the lower supporting means, means for supplying candy sticks, arranged in the said space between the guideways, trays movable one after the other on the said supporting means by the said followers, tray elevators for moving the trays vertically in the said guideways, latches for supporting trays in superposed disposition in the said guideways, means on one of the elevators for coöperating with one of the latches to disengage said latch from the superposed trays in one of the guideways and permit descent of the said trays, means for removing candy sticks from each tray during the movement thereof into position below the supply means, and means for receiving the sticks so removed and carrying the same to a point at which the sticks can be taken from the apparatus.

9. In an apparatus for cooling candy sticks, the combination of a main frame having vertical guideways separated by an intervening space, supporting means connecting the upper ends of the said guideways, supporting means extending between and below the lower ends of the guideways, a follower movable above the upper supporting means, a follower movable above the lower supporting means, an endless conveyer arranged in the space between the guideways and having spaced partitions adapted to receive between them sticks to be cooled, a stationary support over which the sticks are rolled by the upper stretch of the conveyer, a bottom movable in opposite directions and adapted in one position to support candy sticks in the lower stretch of the conveyer, trays movable one after the other, on the said supporting means by the said followers, tray elevators for moving the trays vertically in the said guideways, latches for supporting trays in superposed disposition in the said guideways, means on one of the elevators for coöperating with one of the latches to disengage said latch from the superposed trays in one of the guideways and permit descent of the said trays, means for removing candy sticks from each tray during the movement thereof into position below the supply means, and means for receiving the sticks so removed and carrying the same to a point from whence the sticks can be conveniently removed from the said means.

10. In an apparatus for cooling candy sticks, the combination of a main frame having vertical guideways, tray elevators disposed under said guideways, vertical movable levers having outer arms disposed to move the elevators, a shaft bearing a cam, a lever movable by said cam, connections intermediate the said lever and the inner arms of the first-named levers, and means for rotating the said shaft.

11. In an apparatus for cooling candy sticks, the combination of a main frame, an endless conveyer having spaced partitions adapted to receive between them candy sticks, a bottom movable in the same direction as the conveyer and below the lower stretch thereof to support candy sticks in said stretch, a lever connected with and adapted to transmit motion to the said bottom, means for moving the conveyer, and means for moving the said bottom.

In testimony whereof we have hereunto set our hands in presence of two subscribing witnesses.

PAUL R. CAMP.
THOMAS J. EUBANKS.

Witnesses:
E. A. DAVIDSON,
R. E. OZMER.